No. 794,194. PATENTED JULY 11, 1905.
H. W. SPANG.
ELECTRIC CIRCUITS FOR RAILWAY SIGNALING.
APPLICATION FILED JULY 30, 1902.
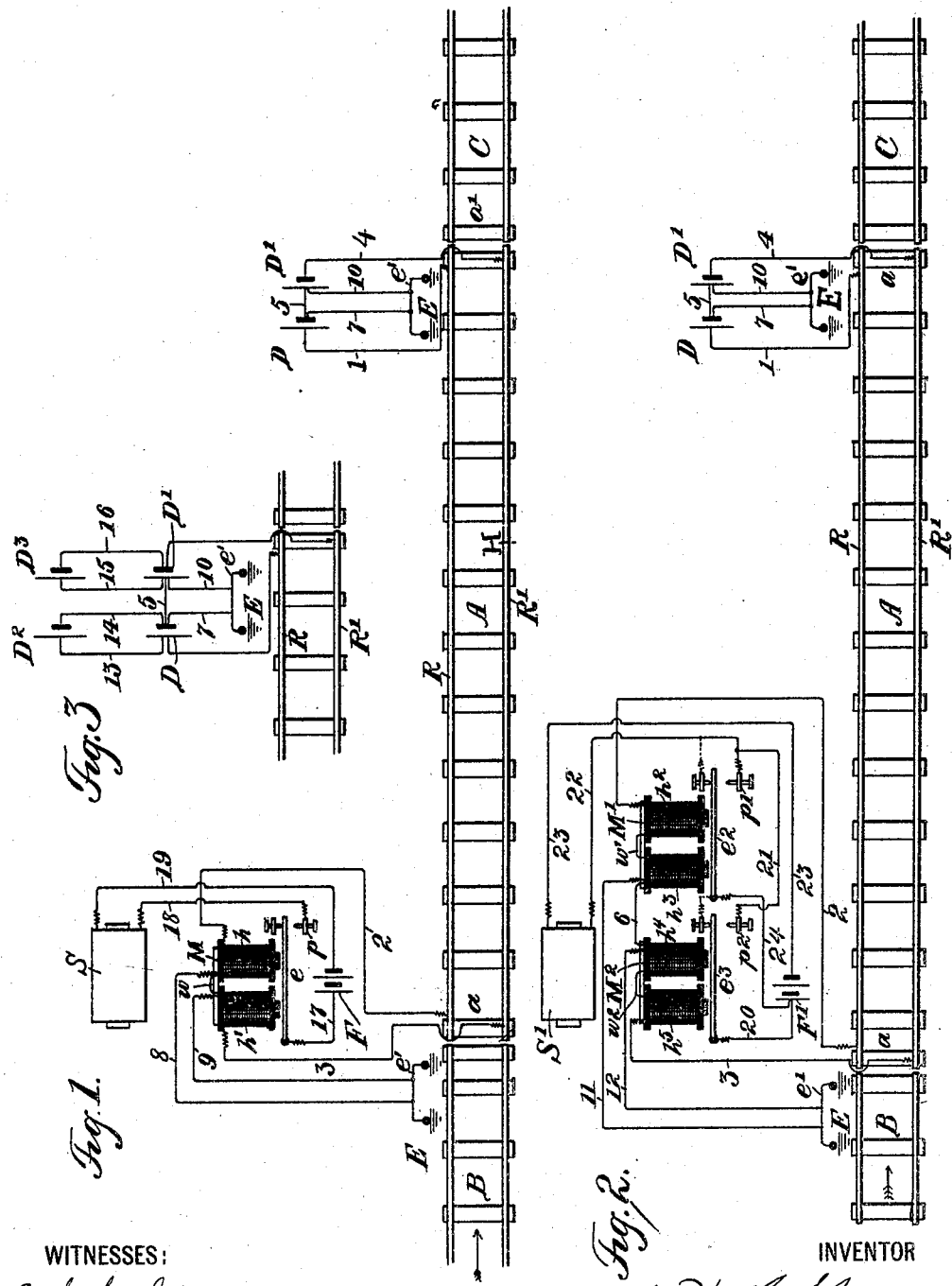
WITNESSES:
INVENTOR No. 794,194.                                             Patented July 11, 1905.

UNITED STATES PATENT OFFICE.

HENRY W. SPANG, OF NEW YORK, N. Y., ASSIGNOR, BY MESNE ASSIGNMENTS, TO CHARLES H. KETCHAM, OF YONKERS, NEW YORK.

ELECTRIC CIRCUITS FOR RAILWAY SIGNALING.

SPECIFICATION forming part of Letters Patent No. 794,194, dated July 11, 1905.

Application filed July 30, 1902. Serial No. 117,696.

*To all whom it may concern:*

Be it known that I, HENRY W. SPANG, a citizen of the United States, and a resident of New York city, in the county of New York and State of New York, have invented certain new and useful Improvements in Electric Circuits for Railway Signaling, of which the following is a specification.

My invention relates particularly to that class of railway-signals in which the rails of a section of track constitute, respectively, the two sides of an electric circuit, including at one end of said section a suitable generator of electricity whose two poles are connected to the two lines of rails and including at the other end of said section the coils of a controlling electro magnet or magnets for the signal apparatus or other devices whose action depends upon the condition of the circuit containing or governing the condition of such electro magnet or magnets.

My invention is designed more particularly as an improvement upon that type of circuit known as the "closed metallic" or "constant" circuit, wherein the circuit is in normally closed condition and the signal is made or other action is brought about through variations of condition of said circuit produced through the presence of wheels and axles upon the line of rails, thus shunting current from the controlling-electromagnet. As is well known, such a system is generally organized to cause the signal or other apparatus to be held at "safety" or in normal position or condition while the circuit is normally charged and no car or locomotive is on the section of track, while the shunting of the current by the wheels and axles of the car or locomotive causes the danger-signal to be given.

My invention consists, substantially, in the combination, with the usual metallic track-circuit having the usual generator and controlling magnet or magnets, of ground-circuits formed, respectively, by connections made to earth at opposite ends of the section of track and in such manner as to afford two circuits, formed, respectively, over the two sides of the track-circuit and the ground, said ground-circuits including a coil or coils of the controlling magnet or magnets for the signals, operating conjointly with the usual metallic rail-circuit to maintain the signal in the normal condition.

In carrying out my invention it is desirable to employ as a generator for the track-circuit one which is made in two or more sections to permit the ground connection or connections to be established with the center of said sections of generator. In this case the section connected immediately with one line of rails forms the generator for one of the ground-circuits and the section connected with the other line of rails forms the generator for the other ground-circuit, while the two sections together operate in conjunction over the metallic or constant rail circuit. In a similar way it is preferable that the controlling-magnet or system of magnets should embrace a number of coils or sections of coils connected into the metallic or rail circuit in series, the ground-circuits being formed by taking a connection from the point between two coils or coil-sections which respectively connect to the two sides of the rail-circuit or that part of the system herein designated as the "constant" circuit when the said rail-circuit is a normally closed one and the action of the signal is produced by shunting the generator.

In carrying out my invention I may use obviously a signal-electromagnet having two helices and cores to form a horseshoe-magnet, or I may employ two separate electromagnets, or, as will be obvious, the two coils between which the ground connection is established may be sections of the same coil.

While it is preferable, as already described, to utilize the track-circuit generator as a ground-circuit generator also, I do not limit myself to such arrangement.

In the accompanying drawings, Figure 1 is a diagram illustrating one form of my invention as applied to one track of a double-track system in which the trains always move in one direction, as indicated by the arrow, the second or return track not being illustrated herein. Fig. 2 is a modification. Fig. 3 illustrates a series multiple arrangement of batteries with the rails and ground connections.

A is a section of railway-track which may be a mile long, more or less, and having its two lines of rails R R' separated from metallic contact with the rails of the adjacent sections B and C, as shown at $a$ and $a'$. Each line of rails should have good metallic continuity throughout the length of the section by means of suitable bonds or other good metallic connections at the rail-joints thereof.

D and D' are galvanic batteries or cells of the type best adapted for track-circuits.

M, M', and $M^2$ are relay or electromagnets of suitable type, the helices $h\ h'$, $h^2\ h^3$, and $h^4\ h^5$ of which are energized by batteries D and D' when the section of track A is clear and deenergized when the wheels and axles of a locomotive or train metallically connect rails R R' and shunt the current of said batteries from said helices. When helices $h\ h'$ of magnet M of Fig. 1 are deënergized, the lever $e$ contacts with post $p$ and causes current of signal-battery F to flow over wire 17, lever $e$, post $p$, wire 18, signal-magnet S, and wire 19, energizing said magnet and causing a danger-signal to be given.

When the helices $h^2\ h^3$ and $h^4\ h^5$ of magnets M' $M^2$ of Fig. 2 are deënergized, levers $e^3$ and $e^2$ contact with posts $p'\ p^2$ and cause current of signal-battery F' to flow over wire 20, lever $e^3$, post $p^2$, wire 21, and over wire 24, lever $e^2$, and post $p'$ to wire 22, and through signal-magnet S' to wire 23 and back to the battery, thus energizing said magnet S' and causing the danger-signal to be given. This is the action if the local circuit be normally open. If it be normally closed, the front stop of lever $e^3$ would be connected to lever $e^2$ and the front stop of the latter to wire 22, as indicated by the dotted lines. In this case when the magnets $M^2$ M' are deënergized the circuit by wire 20, lever $e^3$, front stop therefor, lever $e^2$, front stop for the latter, wire 22, and magnet S' would be broken and the signal be given.

E in the several figures indicates ground connections or systems of ample efficiency to afford much better electrical connection with the earth than that afforded by the two lines of rails in connection with the ties, ballast, and adjacent surface earth, and especially during the moist condition thereof. This earth connection may consist of a suitable number of iron pipes or other metallic bodies driven or buried in the earth and to which wires $e'$ are connected at intervals. To the latter connections are run from the metallic circuit already described in any suitable way to establish the earth or ground circuits, as will be presently described, formed in part over the rails or sides of the metallic circuit.

In the track-circuits now in use the battery-current must flow in a series circuit over both lines of rails and the magnet or magnets, and in consequence an appreciable resistance and retardation is offered to the current and thereby causing a tendency of the current to greatly flow to and from the earth and between the rails during heavy rainfalls, snow slushes, &c., and in some cases rendering the magnet inoperative.

By employing ground connection or system E with batteries D D', as shown in Figs. 1 and 2, and with helices $h\ h'$ of magnet M, Fig. 1, or with wire $w$ connecting them, or with helices $h^3\ h^4$ of magnets M' $M^2$, Fig. 2, or with wire 6 connecting them two independent ground-circuits, each containing a helix or magnet, a line of rails, and a battery, will be provided, as well as the ordinary metallic circuit, embracing both helices of magnet or both magnets, both lines of rails, and all the batteries. It is evident that with such ground-circuits the resistance and retardation offered to the battery-current will be greatly reduced, and consequently the current-flow between the rails via the intervening wooden ties and ballast, also between the rails and earth, and vice versa, will be reduced to a minimum, so that the rails may be used for longer signal-circuits than is possible with the ordinary track-circuit.

In Fig. 1 one ground-circuit embraces wire 7, battery D, wire 1, rails R, wire 2, helix $h$, and wire 8, and the other ground-circuit embraces wire 9, helix $h'$, wire 3, rails R', wire 4, battery D, and wire 10. By means of wire $w$, connecting helices $h\ h'$ of magnet M, and of wire 5, connecting batteries D D', the two helices $h\ h'$, two lines of rails R R', and two batteries D D' will, with wires 1, 2, 3, and 4, constitute an ordinary metallic track-circuit.

In Fig. 2 one ground-circuit embraces wire 7, battery D, wire 1, rails R, wire 2, magnet M', and wire 11, and the other ground-circuit embraces wire 12, magnet $M^2$, wire 3, rails R', wire 4, battery D', and wire 10. By means of wire 5, connecting batteries D and D', and of wire 6, connecting magnets M' and $M^2$, the two magnets M' $M^2$, two lines of rails R R', and two batteries D D' will, with wires 1, 2, 3, and 4, also constitute an ordinary metallic track-circuit.

Instead of employing a single battery or cell for each ground-circuit, as shown and described, two batteries in multiple can be employed for each ground-circuit, as shown in Fig. 3, and especially for such circuits as shown in Fig. 2.

It is obvious that the helices of magnets M' and $M^2$ could be connected up in other ways, as well understood in the art, so as to still be in a metallic circuit formed over the two lines of rails, and that the ground connection might be formed in substantially the manner already described to place half of the magnet-coils in one ground-circuit and half in the other ground-circuit. It is also obvious that my invention is not confined to any particular location of the magnets S S' or to giving a signal by any particular means or any particular number of magnets.

Complete metallic circuits, each formed as described over the two lines of rails and through the magnet-coils, are known as "constant" circuits, by which is understood a circuit whose magnet or magnets are operated or controlled without actually opening the circuit through the magnet or magnets.

In the ordinary track-circuit or constant circuit now in use a safety-signal can be given when a rail of a section is removed or broken, and especially when the surface earth is well moist. This is due to the two portions of line of rails on each side of the broken or removed rail serving as ground connections. Thus if a rail was removed or broken at H, Fig. 1, the portion of rails R' between H and $a'$ would constitute one ground connection and the portion of rails R' between H and $a$ would constitute the other ground connection of the circuit embracing magnet M, line of rails R, and batteries.

As the proper operation of lever $e$ of magnet M depends upon the energizing of both helices $h$ and $h'$ at the same time by both the metallic or constant circuit and the ground-circuits, it is evident that a danger-signal will be given when a rail is removed or broken in either line of rails R or R'.

If a rail is removed or broken in line of rails R, Fig. 2, helices $h^2$ and $h^3$ of magnet M' cannot be energized, and if in line of rails R' the helices $h^4$ and $h^5$ of magnet $M^2$ cannot be energized, and consequently in either case a danger-signal will be given.

Instead of one lever $e$ of magnet M, Fig. 1, two levers can be employed, one for each helix of magnet, and both employed so that signal-magnet S can only be energized in the same manner as signal-magnet S' of Fig. 2.

During a thunderstorm the rails R R' become highly electrified by induction of the overhead-charged clouds and at the time of a lightning-discharge taking place between the clouds and the earth in line with adjacent or even remote points such induced electricity will discharge into the earth. Ordinarily there is some retardation for such induced electricity to discharge readily from the rails to the earth, due to the resistance of the wooden ties and ballast separating the rails from the surface earth.

As the ground connections herein described must be of high efficiency, it is quite evident that the induced electricity of the rails can thereby more readily discharge or unite with the induced electricity of the earth, I do not confine myself to the employment of both relay-magnet coils in Fig. 1 and both relay-magnets in Fig. 2 in independent ground-circuits, as it is obvious that by dispensing with wires 9 and 10 in Fig. 1 one of the magnet-coils will be in a ground-circuit. So, also, if wires 12 and 10 in Fig. 2 are dispensed with, one of the relay-magnets will be in a ground-circuit. It is obvious that each relay M' and $M^2$, Fig. 2, can control a separate signal-circuit and signal instead of the same signal-circuit and signal.

What I claim as my invention is—

1. In an electric railway signal apparatus, the combination with a track-circuit formed over the two lines of rails constituting a section of track, of ground-circuits formed over ground connections and each including one side of the track-circuit and grounds at opposite ends of the section and signal-controlling magnet-coils included both in the track-circuit and in said ground-circuits, as and for the purpose described.

2. The combination substantially as described, of a track-circuit comprising the two lines of rails of a section of track, a generator at one end of said section and signal-controlling magnet-coils at the other end of said section, and ground-circuits formed respectively over ground connections at opposite ends of said section and the two lines of rails, said ground-circuits including said coils as and for the purpose described.

3. The combination substantially as described, of a track-circuit consisting of two lines of rails of a section of track, a sectional generator signal-controlling magnet-coils, and ground connections taken from said track-circuit at opposite ends of the section and from points on said circuit respectively between the sections of generator and between said coils.

4. The combination substantially as described, of a constant circuit containing two signal-controlling magnet-coils, two or more batteries and two lines of rails, of independent ground-circuits each including one side of the constant rail-circuit and one of said magnet-coils.

5. The combination substantially as described of a constant circuit comprising signal-controlling magnet-coils, two or more batteries and two lines of rails of a section of railway-track and two independent ground-circuits formed over ground connections taken from said constant circuit at opposite ends of the section at points between said magnet-coils and batteries respectively, as and for the purpose described.

6. The combination substantially as described with a track-circuit formed over the two lines of rails constituting a section of railway-track, of ground-circuits each including one side of the track-circuit, and suitable ground connections at opposite ends of the section and control magnet-coils included in said track and ground circuits, as and for the purpose set forth.

7. The combination substantially as described, of a constant circuit containing two signal-controlling magnet-coils, two or more batteries and two lines of rails, of an independent ground-circuit including one side of the constant rail-circuit and one of said magnet-coils.

8. The combination substantially as described, of a constant circuit containing signal-controlling magnet-coils, two or more batteries and two lines of rails, of an independent ground-circuit including one side of the constant rail-circuit and a section of coils.

Signed at New York, in the county of New York and State of New York, this 28th day of July, A. D. 1902.

HENRY W. SPANG.

Witnesses:
J. GALLWITZ,
E. L. LAWLER.